(12) United States Patent
Choi et al.

(10) Patent No.: US 9,881,618 B2
(45) Date of Patent: Jan. 30, 2018

(54) METHOD OF CONTROLLING TERMINAL USING CONTEXT AWARENESS AND TERMINAL THEREOF

(71) Applicant: Samsung Electronics Co., Ltd., Gyeonggi-do (KR)

(72) Inventors: Yoon Jung Choi, Daegu (KR); So Yeon Kim, Seoul (KR); Tae Hyung Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 6 days.

(21) Appl. No.: 14/405,083

(22) PCT Filed: Jun. 19, 2013

(86) PCT No.: PCT/KR2013/005390
§ 371 (c)(1),
(2) Date: Dec. 2, 2014

(87) PCT Pub. No.: WO2014/003354
PCT Pub. Date: Jan. 3, 2014

(65) Prior Publication Data
US 2015/0199969 A1    Jul. 16, 2015

(30) Foreign Application Priority Data

Jun. 29, 2012  (KR) .................. 10-2012-0070434

(51) Int. Cl.
*G06F 21/00*    (2013.01)
*G10L 17/22*    (2013.01)
(Continued)

(52) U.S. Cl.
CPC .............. *G10L 17/22* (2013.01); *G06F 21/32* (2013.01); *G06F 21/629* (2013.01);
(Continued)

(58) Field of Classification Search
CPC ...... G06F 21/32; G06F 21/554; G06F 21/105; G06F 21/88; H04M 1/667; G10L 15/265
(Continued)

(56) References Cited

U.S. PATENT DOCUMENTS 6,480,096 B1 * 11/2002 Gutman ............. G08B 13/1418
340/5.31
6,570,610 B1 * 5/2003 Kipust .................. G06F 21/552
348/156
(Continued)

FOREIGN PATENT DOCUMENTS

KR          100800689       2/2008
KR       1020080060870      7/2008

OTHER PUBLICATIONS

PCT/ISA/237 Written Opinion dated Sep. 2, 2013, issued on PCT/KR2013/005390 (pp. 9).
(Continued)

*Primary Examiner* — Daniel Abebe
(74) *Attorney, Agent, or Firm* — The Farrell Law Firm, P.C.

(57) ABSTRACT

A method of controlling a terminal is provided. The method includes analyzing a sensed voice when a voice is sensed, recognizing a context based a result of the analysis, and performing a predetermined control operation based on the recognized context.

19 Claims, 11 Drawing Sheets

(51) Int. Cl.
 *G06F 21/32* (2013.01)
 *G06F 21/62* (2013.01)
 *H04M 1/725* (2006.01)
 *H04M 1/67* (2006.01)

(52) U.S. Cl.
 CPC .......... *H04M 1/72569* (2013.01); *H04M 1/67* (2013.01); *H04M 1/72577* (2013.01); *H04M 2250/74* (2013.01)

(58) Field of Classification Search
 USPC ...................................... 379/88.02
 See application file for complete search history.

(56) References Cited

U.S. PATENT DOCUMENTS

| | | | | |
|---|---|---|---|---|
| 8,248,237 B2 * | 8/2012 | Fitzgerald | ............... | G06F 21/88 340/457 |
| 8,289,130 B2 * | 10/2012 | Nakajima | ............ | G06F 21/552 340/5.3 |
| 8,387,084 B1 * | 2/2013 | Klappert | ............... | G06F 21/105 380/258 |
| 8,558,662 B2 * | 10/2013 | Nakajima | ............ | G06F 21/552 340/5.3 |
| 9,213,810 B2 * | 12/2015 | Nakajima | ............... | G06F 21/30 |
| 9,253,205 B2 * | 2/2016 | Fitzgerald | ............... | G06F 21/88 |
| 2004/0101112 A1 | 5/2004 | Kuo | | |
| 2008/0034224 A1 * | 2/2008 | Ferren | ................ | G06F 21/88 713/193 |
| 2009/0253406 A1 * | 10/2009 | Fitzgerald | ............... | G06F 21/88 455/410 |
| 2009/0271203 A1 * | 10/2009 | Resch | .................... | G10L 17/00 704/275 |
| 2010/0091953 A1 | 4/2010 | Kim et al. | | |
| 2010/0299749 A1 * | 11/2010 | Bhansali | ............... | G06F 21/572 726/19 |
| 2011/0237220 A1 * | 9/2011 | Matsuoka | ......... | H04M 1/72577 455/411 |
| 2011/0260829 A1 * | 10/2011 | Lee | ....................... | G06F 3/0414 340/5.51 |
| 2013/0137376 A1 * | 5/2013 | Fitzgerald | ............ | H04B 5/0056 455/41.3 |
| 2013/0167170 A1 * | 6/2013 | Klappert | ............... | G06F 21/105 725/25 |
| 2014/0090050 A1 * | 3/2014 | Nakajima | ............... | G06F 21/552 726/16 |
| 2014/0338006 A1 * | 11/2014 | Grkov | .................... | H04L 63/14 726/35 |

OTHER PUBLICATIONS

PCT/ISA/210 Search Report dated Sep. 2, 2013 issued on PCT/KR2013/005390 (pp. 3).

* cited by examiner

[Fig. 1]
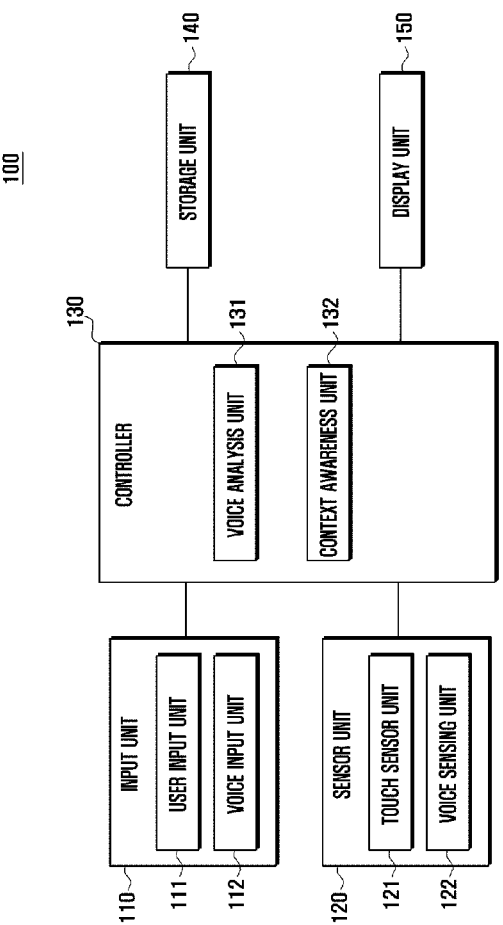

[Fig. 2]
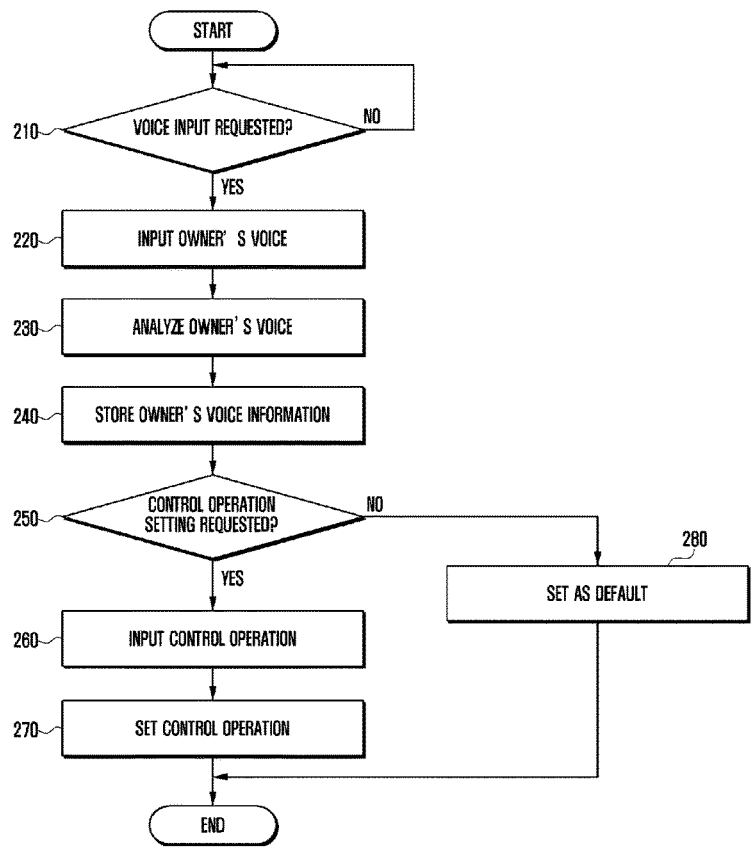
[Fig. 3]

[Fig. 4]
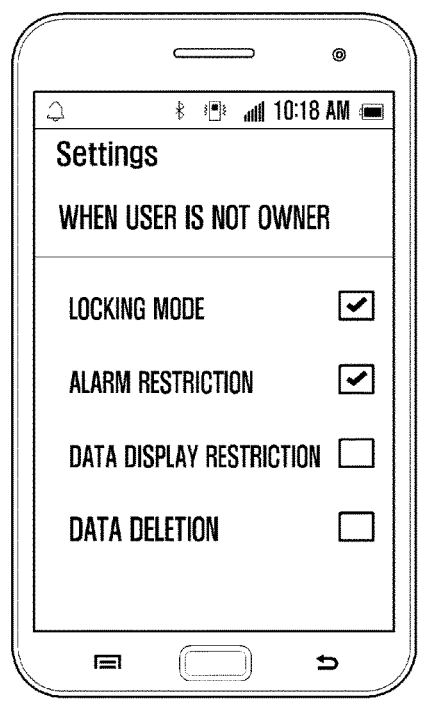
[Fig. 5]
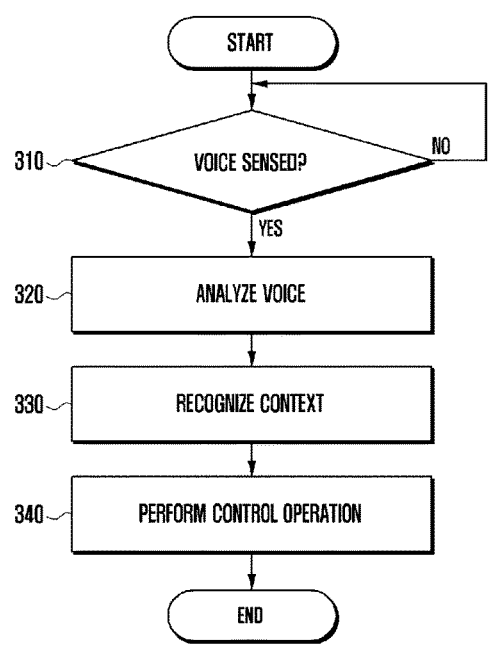

[Fig. 6]
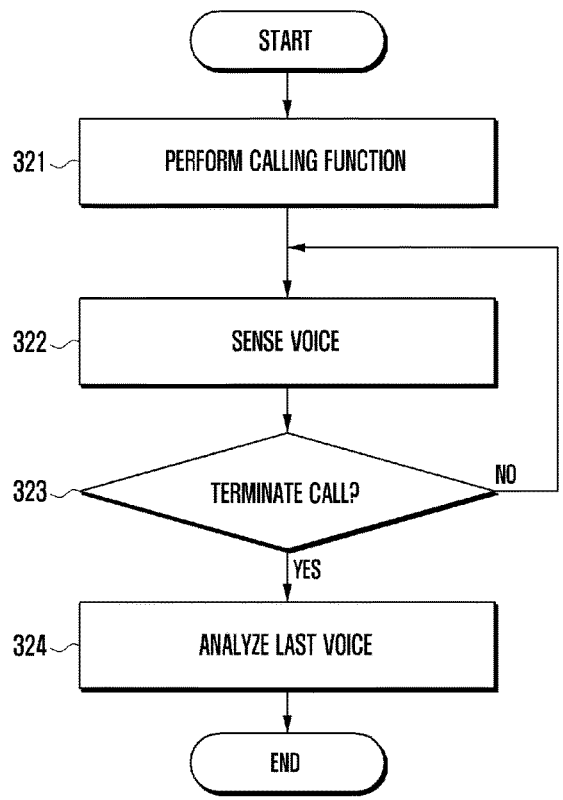
[Fig. 7]
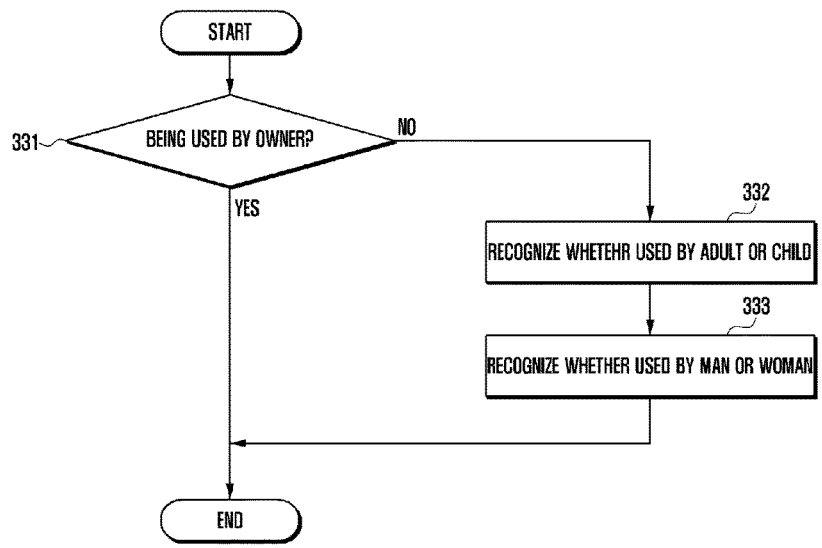

[Fig. 8]

[Fig. 9]
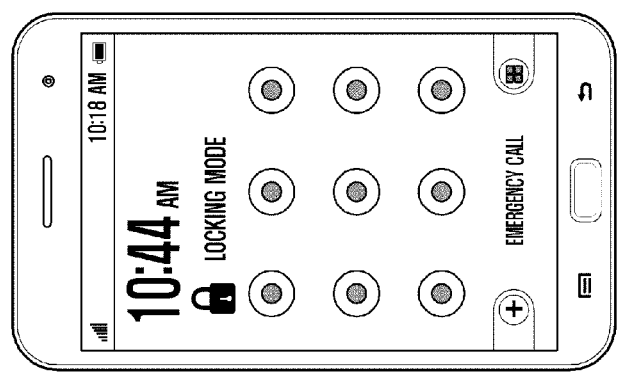
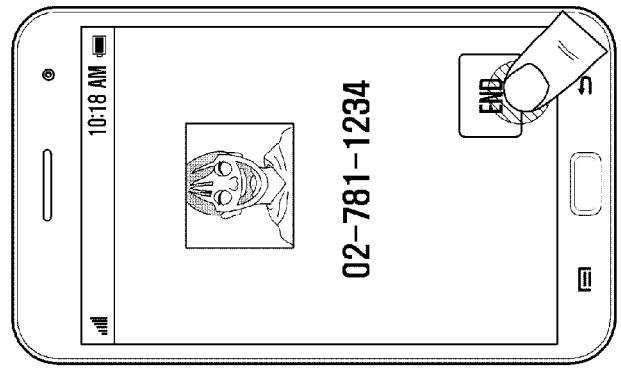

[Fig. 10]
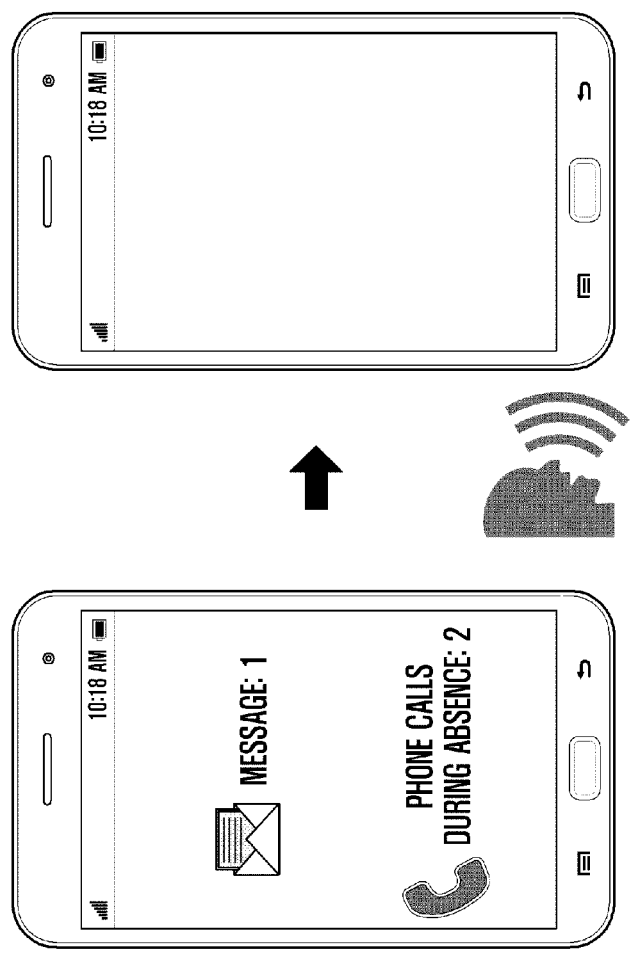

[Fig. 11]
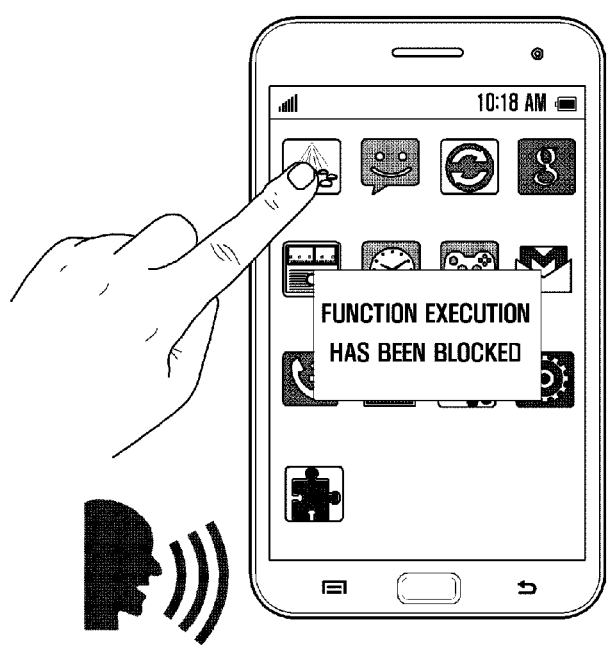

[Fig. 12]
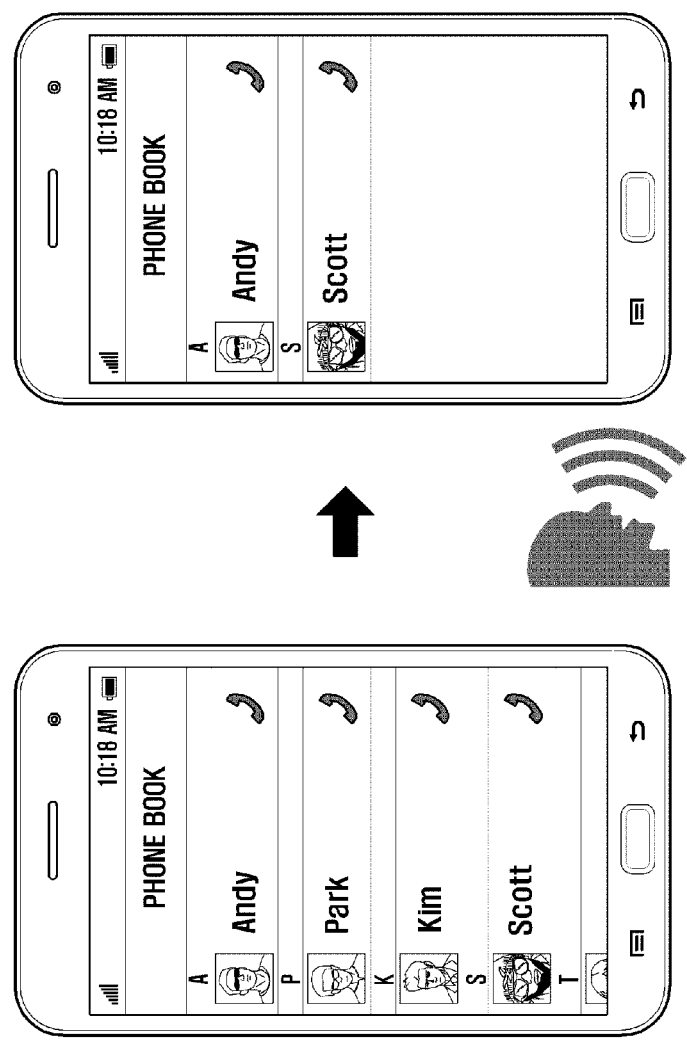

[Fig. 13]
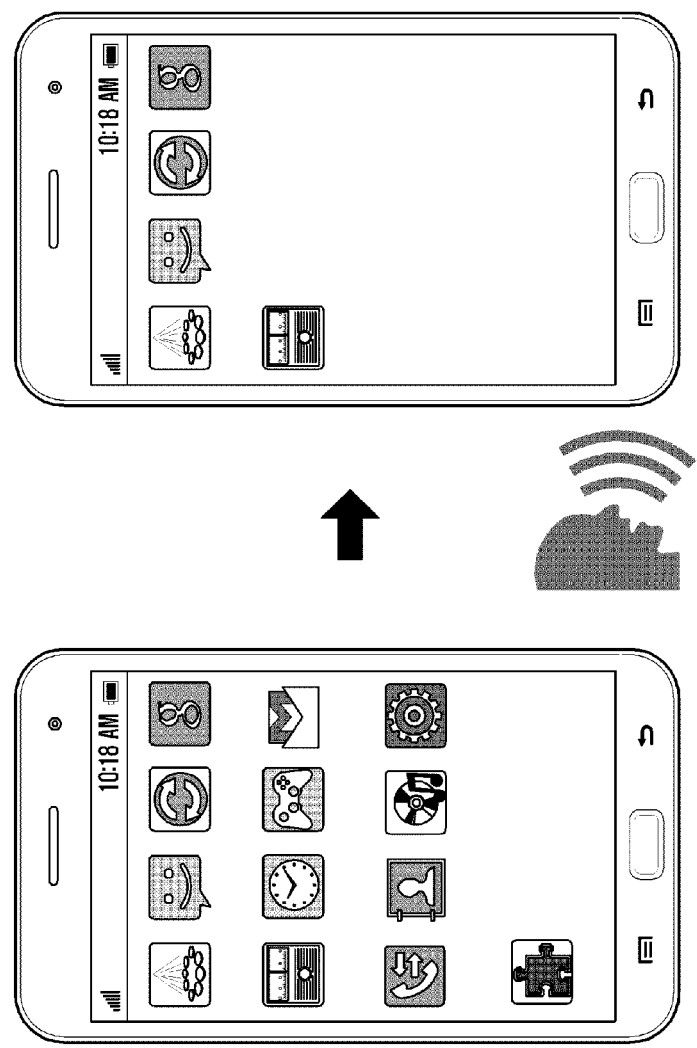

[Fig. 14]
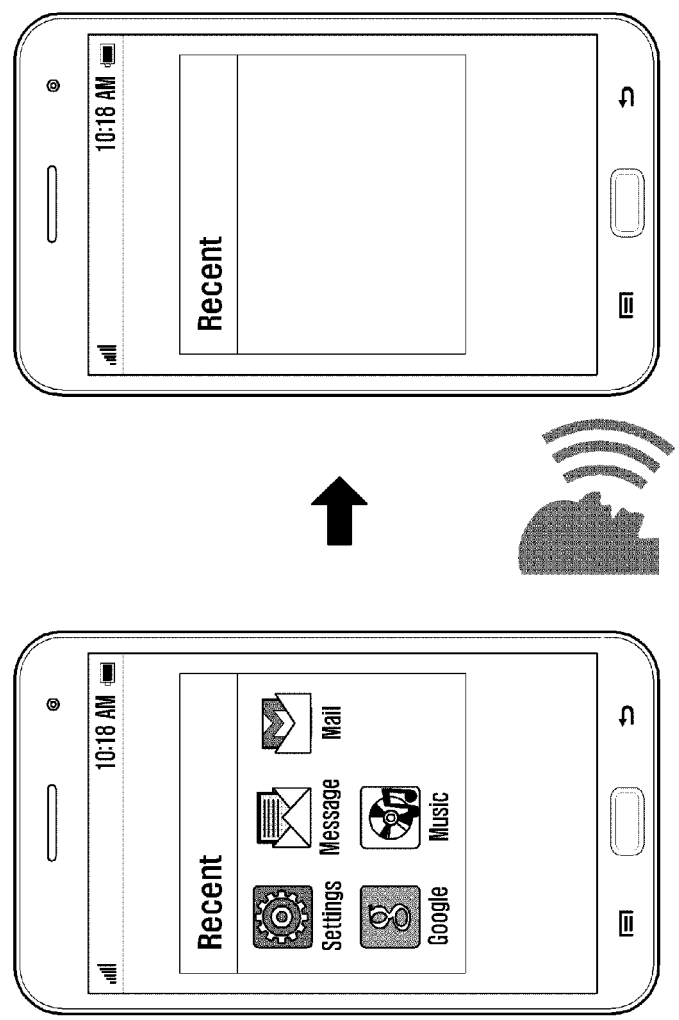

METHOD OF CONTROLLING TERMINAL USING CONTEXT AWARENESS AND TERMINAL THEREOF

TECHNICAL FIELD

The present invention relates to a method of controlling a terminal using context awareness and a terminal thereof, and more particularly, to a method of controlling a terminal using context awareness which recognizes context through a sensed voice analysis and performs a function control of the terminal according to the context, and a terminal thereof.

BACKGROUND ART

Generally, when user desires to restrict or block some functions of a terminal, user directly sets the function restriction by using a related setting function. To this end, user may use a touch input, a voice input, etc.

However, when the terminal is used, a certain function may need to be promptly restricted or reduced without user's specific setting. For example, when the terminal is temporarily handed over to another person and then used, an alarm function, etc. may need to be temporarily blocked for private life protection.

DISCLOSURE OF INVENTION

Technical Problem

At this time, separately restricting the alarm function by user before the terminal is handed over to the another person is inconvenient to user, and thus it is necessary for a function of a terminal to be automatically restricted simultaneously when the terminal is handed over to another person.

Solution to Problem

The present invention has been made in view of the above problems, and provides a method of controlling a terminal using context awareness that recognizes context of the terminal according to whether the terminal is used by a person who does not own the terminal, and a terminal thereof.

The present invention further provides a method of controlling a terminal using context awareness that recognizes context of a terminal, which controls the terminal operation such as recognizing the context of the terminal, blocking a certain function of the terminal or not displaying certain data.

In accordance with an aspect of the present invention, a method of controlling a terminal includes: analyzing a sensed voice when a voice is sensed; recognizing a context based a result of the analysis; and performing a predetermined control operation based on the recognized context. The preset control operation includes at least one of locking mode setting, alarm blocking, certain function use blocking, data display block and data deletion. The analyzing of the voice includes: sensing an externally generated voice; and analyzing at least one of a pitch, a formant and an amplitude of the voice. The analyzing of the voice includes: sensing a voice during performance of a calling function; terminating the calling function; and analyzing a voice sensed right before termination of the calling function. The recognizing of the context includes recognizing whether an owner of the terminal is using the terminal based on the result of the analysis. The recognizing of the context further includes recognizing at least one of whether the terminal is being used by an adult or a child and whether the terminal is being used by a man or a woman if the terminal is not being used by the owner of the terminal. The performing of the control operation includes blocking an alarm for at least one or a text message, an incoming call and a mobile messenger message. The performing of the control operation includes blocking a use of at least one of at least one application, payment function and keypad. The performing of the control operation includes blocking a display of at least one of at least one menu, wallpaper icon and phone number stored in a phonebook. The performing of the control operation includes deleting data on use details including at least one of a calling list and a text message transmission and reception list. In accordance with an aspect of the present invention, a method of controlling a terminal further includes: receiving a voice of an owner of the terminal; analyzing the voice of the owner; and storing owner voice information based on a result of analysis of the owner voice, wherein the recognizing of the situation comprises recognizing whether the terminal is being used by the owner based on the result of analysis and the owner voice information. In accordance with an aspect of the present invention, a method of controlling a terminal further includes: setting in advance the control operation according to a user's input.

In accordance with another aspect of the present invention, a method of controlling a terminal includes: receiving a voice of an owner of the terminal; analyzing the owner voice; storing the owner voice information based on a result of analysis on the owner voice; analyzing a sensed voice when a voice is sensed; recognizing whether the terminal is being used by the owner based on the result of the analysis and the owner voice information; and performing a predetermined control operation based on a result of the recognition.

In accordance with another aspect of the present invention, a terminal includes: a voice input unit that receives a voice; and a controller that analyzes the voice received through the voice input unit, recognizes a context based on a result of the analysis, and performs a predetermined control operation. The predetermined control operation includes at least one of locking mode setting, alarm blocking, certain function use blocking, data display blocking, and data deletion. The voice input unit includes a voice sensing unit that senses whether an external voice has occurred so that the voice input unit receives a voice only when the external voice occurs. The controller analyzes at least one of a pitch, a formant and amplitude. The controller recognizes at least one of whether the terminal is being used by an owner of the terminal, whether the terminal is being used by an adult or a child, and whether the terminal is being used by a man or a woman. In accordance with another aspect of the present invention, a terminal further includes: a storage unit that stores data, wherein the voice input unit receives a voice of an owner of the terminal, and wherein the controller controls the storage unit to analyze the owner voice and store information on the owner voice based on a result of the analysis on the owner voice. In accordance with another aspect of the present invention, a terminal further includes: a storage unit that stores data, wherein the controller controls the controller to store the predetermined control operation.

Advantageous Effects of Invention

According to a method of controlling a terminal using context awareness and a terminal thereof of the present invention, when a person who is not an owner of the terminal uses the terminal, even though there is not specific setting of user, the terminal function may be restricted or blocked according to the method desired by the owner.

Further, according to a method of controlling a terminal using context awareness and a terminal thereof of the present invention, the voice is sensed and analyzed so that the situation that the terminal has been handed over to a person who is not the terminal owner is sensed, and the blocking function is automatically controlled, thereby protecting privacy of user and allowing user to more easily use the terminal.

BRIEF DESCRIPTION OF DRAWINGS

FIG. 1 is a block diagram illustrating a configuration of a terminal that implements a control method according to the present invention;

FIG. 2 is a flowchart illustrating a method of inputting a voice of a terminal owner and setting a control operation according to the present invention;

FIG. 3 illustrates an example of a screen of a voice input by the terminal owner;

FIG. 4 illustrates an example of a screen of setting a control operation;

FIG. 5 is a flowchart illustrating a method of controlling a terminal using context awareness according to the present invention;

FIG. 6 is a flowchart illustrating a method of sensing a voice during performance of a calling function according to the present invention;

FIG. 7 is a flowchart illustrating a method of recognizing a context according to the present invention;

FIG. 8 illustrates an example of a screen of setting a locking mode according to the present invention;

FIG. 9 illustrates an example of a screen of setting a locking mode when a call according to the present invention is terminated;

FIG. 10 illustrates an example of an alarm blocking screen according to the present invention;

FIG. 11 illustrates an example of a screen of blocking a use of a function according to the present invention;

FIG. 12 illustrates an example of a screen of blocking a display of data according to the present invention;

FIG. 13 illustrates another example of a screen of blocking a display of data according to the present invention; and FIG. 14 illustrates an example of a screen of deleting data according to the present invention.

MODE FOR THE INVENTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

The present invention may be applied for context awareness and control of a terminal according to recognized context.

Further, the present invention may be applied to all devices and services that use context awareness as well as general electronic terminals such as a smartphone, a portable terminal, a mobile terminal, a personal digital assistant (PDA), a portable multimedia player (PMP), a notebook computer, a notepad, a Wibro terminal, a smart TV, a smart refrigerator, etc.

FIG. 1 is a block diagram illustrating a configuration of a terminal that implements a control method according to the present invention.

Referring to FIG. 1, a terminal 100 may include an input unit 110, a sensor unit 120, a controller 130, a storage unit 140, and a display unit 150.

The input unit 110 may receive user's operation signal for controlling operation of the terminal 100. The input unit 110 may include a user input unit 111 and a voice input unit 112.

The user input unit 111 may include a keypad, a dome switch, a touch pad, a jog wheel, a jog switch, etc. The user input unit 111 may be substituted by a touch screen by the touch sensor unit 121 and the display unit 150.

The voice input unit 112 may receive audio signals, and may include a microphone, etc. The voice input unit 112 may receive external sound signals by a microphone at a calling mode, a recording mode, a voice sensing mode, etc., and may process the received signals as electric voice data. The processed voice data may be converted into a transmittable form and be outputted to the base station at the calling mode. The voice input unit 112 may implement various noise removing algorithms for removing a noise generated in a process of receiving external sound signals.

The sensor unit 120 may include a touch sensor unit 121 and a voice sensing sensor unit 122.

The touch sensor unit 121 may sense a user's touch input. The touch sensor unit 121 may have a form of, for example, a touch film, a touch sheet, a touch pad, etc. The touch sensor unit 121 may sense a touch input and transmit the sensed touch signal to the controller 120. The controller 120 may analyze a touch signal and perform an operation corresponding to the touch signal. Further, information corresponding to the sensed touch signal may be outputted on the display unit 150. The touch sensor unit 121 may receive operation signals by may receive operation signals by a user's touch input by various input tools. For example, the touch sensor unit 121 may receive operation signals by a user's hand or a physical tool, a stylus pen, an operation button that may be included in the stylus pen, etc.

The voice sensing sensor unit 122 may automatically sense an externally generated voice. When a voice is externally generated, When a voice is externally generated, the voice sensing sensor unit 122 may transmit the voice to the controller 130 so that the terminal 100 may operate at the voice sensing mode. If the mode is changed to the voice sensing mode by the voice sensing sensor unit 122, the terminal 100 may receive a voice through the voice input unit 112.

The controller 130 may control each of various components for overall operation of the terminal 100. For example, the controller 130 may recognize a situation by analyzing a sensed voice, and control the terminal 100 to block the function of the terminal 100.

The controller 130 may includes a voice analysis unit 131 and a context awareness unit 132.

If the voice sensed in the voice sensing sensor unit 122 is inputted through the voice input unit 112, the voice analysis unit 131 may analyze the voice. The voice analysis unit 131 may analyze at least one of a pitch, format and amplitude of the voice. The pitch may indicate periodic characteristics of the voice. The voice analysis unit 131 may analyze periodic characteristics of the time axis using an auto-correlation function or may analyze periodic characteristics of the frequency axis by acquiring the basic frequency based on the frequency elements as a result of FFT.

Formant may indicate resonance characteristics of a vocal track that is generated by a voice. The voice analysis unit 131 may analyze the formant frequency by specifying the area where energy of a voice is concentrated in the frequency domain.

Amplitude may denote intensity of a voice signal. The voice analysis unit 131 may analyze amplitude by sampling and acquiring the size by quantization and encoding.

The voice analysis unit 131 may analyze the gender, age, etc. of the person who generates a voice through voice analysis.

A context awareness unit 132 may recognize the situation of the terminal 100 based on the analysis result of the voice analysis unit 131.

According to an embodiment of the present invention, a controller 120 may analyze a voice through the voice analysis unit 131 when a voice is sensed, and may recognize the context based on the result of analysis through the context awareness unit 132. Further, the controller 120 may perform preset control operation based on the recognized context.

The controller 130 will be described later in detail with reference to the attached drawings.

A program or commands for the terminal 100 may be stored in the storage unit 140. The controller 130 may perform a program or commands stored in the storage unit 140.

The storage unit 140 may include a flash memory type, a hard disk type, a multimedia card micro type, card type memory (e.g., SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, etc.

According to an embodiment of the present invention, the storage unit 140 may store generated owner voice information based on the result of analysis on the owner voice analyzed through the voice analysis unit 131 for the voice of the owner inputted through the voice input unit 112.

Further, according to an embodiment of the present invention, the storage unit 140 may store a predetermined arbitrary control operation based on the recognized context. That is, when an arbitrary situation (context) is recognized, the storage unit 140 may preset and store control operation that may be performed by the terminal 100.

The display unit 150 displays (outputs) information processed in the terminal 100. For example, the display unit 150 may display a user interface or a graphic user interface related with voice sensing, context awareness and function control.

The display unit 150 may operate as a touch screen by forming a layer structure with a touch sensor unit 121. Here, the display unit 150 may also be used as an input device as well as an output device.

The touch sensor unit 121 may convert a change such as pressure and capacitance applied to a certain area of the display unit 150 into an electric input signal. The touch sensor unit 121 may be configured to detect a touch pressure as well as a touched location and area.

Components illustrated in FIG. 1 are not essential, and thus more or less components may be used to implement the terminal 100.

FIG. 2 is a flowchart illustrating a method of inputting a voice of a terminal owner and setting a control operation according to the present invention.

Referring to FIG. 2, the owner voice input and control operation setting method may be performed in an order described below.

First, the terminal 100 may determine whether a voice input request has been generated (210).

The voice input request is a request for inputting a voice of the owner of the terminal 100, and may be generated according to user's request or automatically as is necessary. The terminal 100 may display an icon, a menu, etc. for receiving a voice input request.

If a voice input request is generated, the terminal 100 may receive an input of the voice of the terminal owner (220).

The terminal 100 may display an icon, image, UI or GUI, etc. for notifying a state where a voice is being inputted or a state where a voice is possible while a voice of the terminal owner is being inputted. For example, referring to FIG. 3, the terminal 100 may display an image of a microphone shape and/or an icon (e.g., 0, etc.), a text image (e.g., REC, etc.) indicating that a voice is being inputted.

When a plurality of owners for the terminal 100 are recognized, the terminal 100 may receive an input of a voice for one of the owners. In this case, the terminal 100 may receive identification information of the owner. When the identification information of the owner is not received or it is impossible for the identification information to be received, the terminal 100 may set arbitrary identification information for the owner.

Next, the terminal 100 may analyze the owner's voice (230).

The terminal 100 may analyze the inputted voice of the owner. The terminal 100 may analyze at least one of a pitch, formant and amplitude of a voice of the owner. The terminal 100 may analyze periodic characteristics of the time axis using an auto-correlation function or may analyze periodic characteristics of the frequency axis by acquiring the basic frequency based on the frequency elements as a result of FFT. The terminal 100 may analyze the format frequency by specifying by specifying the area where energy of a voice is concentrated in the frequency domain. Further, the terminal 100 may analyze amplitude by sampling and acquiring the size by quantization and encoding.

The terminal 100 may analyze the gender, age, etc. of the terminal owner through voice analysis.

The terminal 100 may perform a separate process such as a noise elimination and sound amplification in order to increase accuracy for the analysis of the owner's voice.

Next, the terminal 100 may store voice information of the owner (240).

The terminal 100 may store the owner's voice information based on the result of analysis. The owner's voice information may contain the pitch, formant, amplitude of the acquired voice, gender and age of the person who generates the voice, etc. The terminal 100 may store the voice information of the owner in the form of a graph, digital data, analog data, numbers, etc. according to the frequency or time domain.

When a plurality of owners of the terminal 100 are recognized as is necessary, the terminal 100 may store voice information for a plurality of users. At this time, the terminal 100 may store voice information for each user along with identification information for a plurality of users.

The terminal 100 may determine whether a control operation setting request has been generated (250).

The terminal 100 may determine whether a control operation setting request for an arbitrary recognized context has occurred. The control operation setting request may occur according to user's request or automatically as is necessary. For example, the control operation setting request may automatically occur after a voice input of the owner according to the voice input request.

When the control operation setting request occurs, the terminal 100 may receive an input of the control operation (260).

The terminal 100 may display a list, icon, related UI or GUI of recognized context in order to receive a control operation setting. Further, the terminal 100 may display a menu, a control operation list, icon, related UI or GUI for receiving an input of the control operation. For example, referring to FIG. 4, the terminal 100 may display a locking mode, an alarm restriction, a data display restriction, a data deletion, etc. in a list as a control operation according to selection of a case where the recognized context is a situation of use of a user who is not a terminal owner. Further, the terminal 100 may display an icon and a check box according to user's selection input or current control operation setting state, or shaded control operation.

The terminal 100 may receive control operation for the recognized context (situation) of the terminal 100. The recognized context may be one of whether used by the owner, whether used by an adult or a child, and whether used by a man or a woman. The terminal 100 may receive different control operation according to the context.

Next, the terminal 100 may set control operation (270).

The terminal 100 may set control operation to be performed according to context awareness based on the inputted control operation. The control operation may include at least one of locking mode setting, an alarm block, a certain function use block, a data display block, data deletion.

The terminal 100 may set control operation for the recognized context of the terminal 100. The recognized context may be at least one of whether used by the owner, whether used by an adult or a child, and whether used by a man or a woman. The terminal 100 may receive different control operation according to the context. The terminal 100 may set different control operation according to the context.

When a plurality of owners of the terminal 100 are recognized, the terminal 100 may differently set control operation for each owner.

When there is no control operation setting request, the terminal 100 may set the control operation as default (280).

For example, when the terminal 100 is not being used by the owner, the terminal 100 may be set to perform control operation that sets the locking mode as default. Further, when the terminal 100 is used by a child, the terminal 100 may be set to perform control operation that blocks the use of an application and keypad function that is charged as default.

FIG. 5 is a flowchart illustrating a method of controlling a terminal using context awareness according to the present invention.

Referring to FIG. 5, a method of controlling a terminal using context awareness may be performed in an order described below.

First, the terminal 100 may recognize whether a voice is sensed (310).

The terminal 100 may sense whether a voice is externally sensed trough the voice sensing unit 122. The sensed voice may be a user's voice of the current terminal including the owner.

When the voice is sensed, the terminal 100 may analyze the voice (320).

The terminal 100 may analyze the sensed voice. The terminal 100 may analyze at least one of a pitch, formant, amplitude of the sensed voice. The terminal 100 may analyze periodic characteristics of the time axis using an auto-correlation function or may analyze periodic characteristics of the frequency axis by acquiring the basic frequency based on the frequency elements as a result of FFT. The terminal 100 may analyze format frequencies by specifying the area where energy of a voice is concentrated in the frequency domain. Further, the terminal 100 may analyze amplitude by sampling the voice signal and acquiring the size by quantization and encoding.

The terminal 100 may analyze the gender, age, etc. of the current user of the terminal 100 through sound analysis.

The terminal 100 may perform a separate process such as a noise removal, sound amplitude, etc. in order to enhance accuracy for the sound analysis of the owner.

The terminal 100 may sense the sound during the calling function performance and analyze the sensed sound.

Specifically, referring to FIG. 6, the terminal 100 may perform a calling function (321).

The terminal 100 may perform an outgoing call according to user's request or may perform an incoming call according to a receiving allowance request of user for a received call.

Next, the terminal 100 may sense the voice (322).

The terminal 100 may sense voice externally generated during performance of a calling function. At this time, the sensed voice may be a user's voice for performing a call. The sensed voice may be transmitted to the base station through the signal processing according to the performance of a calling function so as to be transmitted to the calling opponent terminal. Further, the sensed voice may be sampled or recorded according to whether a function additionally provided along with the calling function is used.

Next, the terminal 100 may determine whether the calling has been terminated (323).

The terminal 100 may determine whether the calling is terminated as the user's request or the signal transmission and reception with the base station becomes impossible.

When the calling is not terminated, the terminal 100 may continually sense the voice.

In contrast, when the calling is terminated, the terminal 100 may analyze the lastly sensed voice (324).

The terminal 100 may analyze the voice sensed right before the last sensed voice, i.e., termination of the calling. As such, the terminal 100 may determine whether the terminal 100 has been terminated to another user, not the owner, right before the termination of the calling. The function restriction for privacy protection may be achieved when a user other than the owner of the terminal 100 tries to use other functions of the terminal 100.

Next, the terminal 100 may recognize context (330).

The terminal 100 may recognize the current situation of the terminal 100 based on the result of analysis of the voice. The terminal 100 may recognize the owner's situation of use based on the result of voice analysis. Further, the terminal 100 may recognize at least one of whether used by the owner, whether used by an adult or a child, and whether used by a man or a woman.

Specifically, referring to FIG. 7, the terminal 100 may recognize whether the terminal 100 is being used by the owner (331).

The terminal 100 may recognize whether the current terminal 100 is being used by the owner based on the result of voice analysis. That is, the terminal 100 may determine whether the sensed voice is the voice of the owner. The terminal 100 may recognize whether the terminal is used by the owner by determining whether the sensed voice coincides with the voice information of the owner as a result of analysis based on the pre-stored owner's voice information.

When the terminal is not being used by the owner, the terminal 100 may recognize whether the terminal is used by an adult or a child (332). The terminal 100 may determine whether the current user of the terminal 100 is an adult or a child. The terminal 100 may apply a preset threshold value to the result of analysis in order to determine whether user is an adult or a child. For example, if the pitch is larger than the threshold value as a result of the voice analysis, the terminal 100 may determine that the user of the current terminal 100 is a child.

The terminal 100 may recognize whether the terminal 100 is being used by an adult or a child regardless of whether the terminal 100 is being used by the owner as is necessary.

Further, the terminal 100 may recognize whether the terminal is being used by a man or a woman (333).

The terminal 100 may determine whether the current user of the terminal 100 is a man or a woman. The terminal 100 may apply a preset threshold value to the analyzed result in order to determine whether user is a man or a woman. For example, as a result of the voice analysis, if the pitch is greater than the threshold, the terminal 100 may determine that the user is a woman.

The terminal 100 may recognize one situation or a combination of two or more situations. For example, the terminal 100 may recognize whether the current user of the terminal 100 is a man.

Next, the terminal 100 may perform control operation (340).

The terminal 100 may perform control operation based on the recognized context (situation). The control operation may include at least one of locking mode setting, alarm blocking, certain function use blocking, data display blocking, and data deletion. The control operation may be preset as a default that is provided by user or in the terminal 100.

Specifically, the control operation may be an operation that sets the locking mode.

For example, referring to FIG. 8, as a result of the voice analysis, if the terminal 100 is being used by the owner of the terminal 100, the locking mode of the terminal 100 may be set. The terminal 100 may set the screen off mode, power-save mode, power off mode, etc. instead of setting the locking mode. The terminal 100 may display the locking release UI, the password input UI, the pattern input UI, etc. according to the locking mode.

If the user including the owner of the terminal 100 inputs a password or pattern for releasing the locking mode, the terminal 100 may cancel the locking mode and allow the use of the terminal 100.

Further, for example, referring to FIG. 9, the terminal 100 may analyze the voice based on the voice recognized during the calling function performance, and when it is recognized that the user, not the owner, uses the terminal 100 at the time of terminating a call as a result of analysis of the voice, the locking mode may be set. As such, the terminal 100 may release the locking mode for calling, and may prevent another user from using the function of the terminal 100 according to the locking mode release state after the termination of a call.

The control operation may be an operation for blocking the alarm.

The terminal 100 may block the alarm on reception of a text message, an e-mail, a phone call, a mobile messenger message, etc. based on the recognized situation. The object for blocking the alarm may be set in advance by the user. The terminal 100 may block an unconfirmed text message, an unconfirmed e-mail, an unconfirmed mobile messenger message, an alarm for existence of a call during absence as well as a text message, an e-mail, a phone call, a mobile messenger message, etc. which are received in real time. Further, the terminal 100 may block an alarm for a text message, an e-mail, a phone call, and a mobile messenger message which are received from a certain user using information stored in a phone book. The terminal 100 may block an alarm displayed on the display unit 150 as well as an alarm that outputs vibration, sound, etc.

For example, referring to FIG. 10, as a result of analysis of the voice, when it is recognized that user who is not the owner is using the terminal, the terminal 100 may block an alarm on whether a text message has been received or there has been a phone call during absence.

The control operation may be an operation that blocks a use of a certain function.

The terminal 100 may block a use of an application and a service which are provided in the terminal 100 based on the recognized context. Further, the terminal may block a use of an application, a service or a touch input which is charged, a keypad operation, a correction for arbitrary data, and a use of a deleting function.

For example, referring to FIG. 11, as a result of voice analysis, when it is recognized that the user who is not the owner uses the terminal 100, the terminal may block the use of a certain application.

At this time, the terminal 100 may display a message, icon, image, UI or GUI indicating that a use of an application has been blocked. The terminal 100 may output a pop-up window, an alarm window, a sound, etc. in order to notify that a use of an application has been blocked.

Further, for example, when it is recognized that the terminal is being used by a child who is not the owner, a calling function, a game and a use of an application that is charged may be blocked. Further, the terminal 100 may prevent a situation where the terminal 100 is arbitrarily operated by a child by blocking a use of a touch input or a keypad operation.

The terminal 100 may store information for a function such as an application and a service provided by the terminal 100 in order to block a use of a certain function. For example, the terminal 100 may store information on a function such as the name of the function, the identifier, the location of the function execution file, supplier information and whether there is a function that is charged.

The control operation may be an operation that blocks a data display.

The terminal 100 may block a display of part or whole of data for a phone number, calling details, a text message list, an e-mail list, a photo album, a memo, etc. stored in the terminal 100 based on the recognized situation. Further, the terminal 100 may block a display of an icon, a menu, widget, UI, GUI, contents, etc. which are set to be displayed on the screen. The data that blocks the display may be set in advance by user. The data that blocks the display may be set for a certain application or service such as a phone number, a photo album, a memo, etc. or may be individually set for data within a certain application or service.

The terminal 100 may rearrange a list or icons on a standby screen for data other than data whose display has been blocked. That is, the layout of the displayed data may be rearranged and displayed so that the location of the blocked data is not displayed empty.

For example, referring to FIG. 12, when it is recognized that a user other than the owner is using the terminal as a result of the voice analysis, the terminal 100 may block a display for a part of information stored in the phone number list.

Further, for example, referring to FIG. 13, when it is recognized that a user other than the owner is using the terminal 100 as a result of the voice analysis, a display of a part of icons which are set to be displayed on a standby screen may be blocked.

The terminal 100 may block a display of data in connection with the blocking of a use of a certain function. For example, when it is recognized that the terminal 100 is being used by a child, the terminal 100 may block a use of a calling and game application. Further, the terminal 100 may block a use of an application by blocking a display of an icon of a calling and game application that is displayed on a standby screen.

The control operation may be a data deleting operation.

The terminal 100 may delete data stored in the terminal 100 based on the recognized context. The terminal 100 may delete history data including a recent use record, a list of an application or execution file that is under operation, a calling record, and a purchasing record. Further, the terminal 100 may delete part or whole of data for a phone number, a calling record, a text message list, an e-mail list, a photo album, a memo, etc. which are stored in the terminal. Here, the terminal 100 may prevent an output of important data when the terminal 100 is lost through data deletion.

For example, referring to FIG. 14, when it is recognized that a user other than the owner uses a terminal 100, the terminal 100 may delete a history list of recently operated applications.

The control operation of the above-described terminal 100 is not limited to one operation, but may be operated by combining two or more operations according to a setting state inputted at the time of manufacturing the user's input or terminal 100.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

The invention claimed is:

1. A method of controlling a terminal, the method comprising:
analyzing a voice when a voice is sensed by a microphone, which is controlled by a controller of the terminal;
recognizing a context based on a result of the analysis; and
performing a predetermined control operation based on the recognized context,
wherein performing the predetermined control operation comprises blocking a display of at least one of an application and a phone number stored in a phonebook while displaying at least one of a graphical locking release user interface, a graphical password input user interface, and a graphical pattern input user interface used for unblocking the display, and
wherein the predetermined control operation includes data deletion that is selectable from a displayed control operation list configured to receive an input from a user.

2. The method of claim 1, wherein the predetermined control operation further includes at least one of locking mode setting, alarm blocking, certain function use blocking.

3. The method of claim 1, wherein the analyzing of the voice comprises:
sensing an externally generated voice; and
analyzing at least one of a pitch, a formant and an amplitude of the voice.

4. The method of claim 1, wherein the analyzing of the voice comprises:
sensing a voice during performance of a calling function;
terminating the calling function; and
analyzing a voice sensed right before termination of the calling function.

5. The method of claim 1, wherein the recognizing of the context comprises:
recognizing whether an owner of the terminal is using the terminal based on the result of the analysis.

6. The method of claim 5, wherein the recognizing of the context further
comprises recognizing at least one of whether the terminal is being used by an adult or a child and whether the terminal is being used by a man or a woman if the terminal is not being used by the owner of the terminal.

7. The method of claim 1, wherein performing the predetermined control operation further comprises blocking an alarm for at least one of a text message, an incoming call and a mobile messenger message.

8. The method of claim 1, wherein performing the predetermined control operation further comprises blocking a use of at least one of an application, a payment function and a keypad.

9. The method of claim 1, wherein performing the predetermined control operation further comprises deleting data on use details including at least one of a calling list and a text message transmission and reception list.

10. The method of claim 1, further comprising:
receiving a voice of an owner of the terminal;
analyzing the voice of the owner; and
storing owner voice information based on a result of analysis of the owner voice,
wherein the recognizing of the context comprises recognizing whether the terminal is being used by the owner based on the result of analysis and the owner voice information.

11. The method of claim 1, further comprising:
setting in advance the predetermined control operation according to a user's input.

12. A method of controlling a terminal, the method comprising:
receiving a voice of an owner of the terminal;
analyzing the owner's voice;
storing the owner's voice information based on a result of the analysis of the owner's voice;
analyzing a voice when a voice is sensed;
recognizing whether the terminal is being used by the owner based on the result of the analysis and the owner's voice information; and
performing a predetermined control operation based on a result of the recognition,
wherein performing the predetermined control operation comprises blocking a display of at least one of an application and a phone number stored in a phonebook while displaying at least one of a graphical locking release user interface, a graphical password input user interface, and a graphical pattern input user interface used for unblocking the display, and wherein the predetermined control operation includes data deletion that is selectable from a displayed control operation list configured to receive an input from a user.

13. A terminal comprising:
a voice input unit that receives a voice; and
a controller configured to:
analyze the voice received through the voice input unit;
recognize a context based on a result of the analysis; and
perform a predetermined control operation to block a display of at least one of an application and a phone number stored in a phonebook while displaying at least one of a graphical locking release user interface, a graphical password input user interface, and a graphical pattern input user interface used for unblocking the display, and
wherein the predetermined control operation includes data deletion that is selectable from a displayed control operation list configured to receive an input from a user.

14. The terminal of claim 13, wherein the predetermined control operation further includes at least one of locking mode setting, alarm blocking, certain function use blocking.

15. The terminal of claim 13, wherein the voice input unit comprises a voice sensing unit that senses whether an external voice has occurred so that the voice input unit receives a voice only when the external voice occurs.

16. The terminal of claim 13, wherein the controller is further configured to analyze at least one of a pitch, a formant and an amplitude.

17. The terminal of claim 13, wherein the controller is further configured to recognize at least one of whether the terminal is being used by an owner of the terminal, whether the terminal is being used by an adult or a child, and whether the terminal is being used by a man or a woman.

18. The terminal of claim 13, further comprising:
a storage unit that stores data, wherein the voice input unit receives a voice of an owner of the terminal, and wherein the controller is further configured to control the storage unit to analyze the owner's voice and store information on the owner's voice based on a result of the analysis on the owner's voice.

19. The terminal of claim 13, further comprising:
a storage unit that stores data, wherein the controller is further configured to store the predetermined control operation.

\* \* \* \* \*